(12) United States Patent
Purdey et al.

(10) Patent No.: US 11,149,579 B2
(45) Date of Patent: Oct. 19, 2021

(54) WASTEGATE ASSEMBLY OR TURBINE

(71) Applicant: CUMMINS LTD, London (GB)

(72) Inventors: Matthew J. Purdey, Huddersfield (GB); Richard Goodyear, Sheffield (GB)

(73) Assignee: Cummins Ltd, London (GB)

( * ) Notice: Subject to any disclaimer, the term of this patent is extended or adjusted under 35 U.S.C. 154(b) by 0 days.

(21) Appl. No.: 16/955,649

(22) PCT Filed: Dec. 18, 2018

(86) PCT No.: PCT/GB2018/053648
§ 371 (c)(1),
(2) Date: Jun. 18, 2020

(87) PCT Pub. No.: WO2019/122836
PCT Pub. Date: Jun. 27, 2019

(65) Prior Publication Data
US 2020/0386114 A1  Dec. 10, 2020

(30) Foreign Application Priority Data
Dec. 19, 2017  (GB) ..................... 1721264

(51) Int. Cl.
*F01D 17/10* (2006.01)
*F02B 37/18* (2006.01)
(52) U.S. Cl.
CPC .......... *F01D 17/105* (2013.01); *F02B 37/186* (2013.01); *F05D 2220/40* (2013.01)
(58) Field of Classification Search
CPC .... F01D 17/105; F02B 37/186; F02B 37/183; F05D 2220/40; Y02T 10/12
See application file for complete search history.

(56) References Cited

U.S. PATENT DOCUMENTS

| 10,570,814 B2 | 2/2020 | Onogi et al. |
| 2012/0292547 A1 | 11/2012 | Jaroslaw et al. |
| 2020/0386114 A1 | 12/2020 | Purdey et al. |

FOREIGN PATENT DOCUMENTS

| CN | 2015163782 A | 9/2015 |
| DE | 102011089777 A1 | 6/2013 |

(Continued)

OTHER PUBLICATIONS

International Search Report and Written Opinion issued by the European Patent Office, dated Feb. 13, 2019, for International Application No. PCT/GB2018/053648; 8 pages.

(Continued)

*Primary Examiner* — Audrey B. Walter
*Assistant Examiner* — Edward Bushard
(74) *Attorney, Agent, or Firm* — Faegre Drinker Biddle & Reath LLP

(57) ABSTRACT

A turbine comprises a turbine housing defining a turbine inlet upstream of a turbine wheel and a turbine outlet downstream of the turbine wheel; and a wastegate valve assembly comprising at least one movable valve member mounted on a movable support member within a wastegate chamber which communicates with the turbine inlet upstream of the turbine, and has one or more chamber outlets which communicate with an outlet of the turbine. The valve member is permitted to articulate slightly about the support member, with the amount of articulation being limited by collisions between respective limit areas on a rear surface of a sealing portion of the valve member and a front surface of the support member. Each valve member is connected to the support member using a pin portion of the valve member which passes through a washer with a non-circular outer profile, and rotation of the washer is limited by contact surfaces of the support member.

18 Claims, 5 Drawing Sheets

(56) References Cited

FOREIGN PATENT DOCUMENTS

| | | | |
|---|---|---|---|
| DE | 102013209864 | A1 | 12/2014 |
| EP | 0401615 | A1 | 12/1990 |
| JP | H04272430 | A | 9/1992 |
| WO | 2014/011468 | A1 | 1/2014 |
| WO | 2016139800 | A1 | 9/2016 |

OTHER PUBLICATIONS

International Preliminary Report on Patentability issued by the European Patent Office, dated Jun. 23, 2020 for International Application No. PCT/GB2018/053648; 6 pages.

UK Intellectual Property Office; Search Report; Application No. GB1721264.8; dated Jun. 13, 2018.

WASTEGATE ASSEMBLY OR TURBINE

CROSS-REFERENCE TO RELATED APPLICATIONS

The present application is a national phase filing under 35 U.S.C. § 371 of International Application No. PCT/GB2018/053648, filed on Dec. 18, 2018, which claims the benefit of priority to British Patent Application No. 1721264.8, filed with the United Kingdom Intellectual Property Office on Dec. 19, 2017, the entire disclosures of which being expressly incorporated herein by reference.

FIELD OF THE DISCLOSURE

The present disclosure relates to a turbine and in particular to a turbine having a wastegate including a wastegate assembly comprising a support member and at least one valve member. The turbine may form part of a turbocharger or power turbine.

BACKGROUND OF THE DISCLOSURE

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of the rotor to do useful work, for example, generating electrical power; and a turbocharger, which uses the rotational energy of the rotor to compress a fluid.

Turbochargers are well known turbomachines for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold.

The turbocharger shaft is conventionally supported by journal and thrust bearings, including appropriate lubricating systems, located within a central bearing housing connected between the turbine and compressor wheel housings.

FIG. 1 shows a schematic cross-section through a known turbocharger. The turbocharger comprises a turbine 11 joined to a compressor 12 via a central bearing housing 13. The turbine 11 comprises a turbine wheel 14 for rotation within a turbine housing 15. The turbine wheel 14 has a rotational axis 1 (in the plane of the diagram) and blades 9. Similarly, the compressor 12 comprises a compressor wheel 16 (or "impeller") which can rotate within a compressor housing 17. The compressor housing 17 defines a compressor chamber 38 which is largely filled by the compressor wheel 16, and within which the compressor wheel 16 can rotate. The turbine wheel 14 and compressor wheel 16 are mounted on opposite ends of a common turbocharger shaft 18 which extends through the central bearing housing 13. The turbocharger shaft 18 is rotatably supported by a bearing assembly in the bearing housing 13 which comprises two journal bearings 34 and 35 housed towards the turbine end and compressor end respectively of the bearing housing 13. The bearing assembly further includes a thrust bearing 36.

The turbine housing 15 has two exhaust gas inlets 19a, 19b located annularly around the turbine wheel 14, and an axial exhaust gas outlet 10. The inlets 19a, 19b are symmetrical with respect to each other in a mirror plane perpendicular to the axial direction. Note that in other known turbine housings there is only one gas inlet. In yet further turbine housings, there are two inlets, but the inlets are not symmetrical.

The compressor housing 17 has an axial air intake passage 31 and a volute 32 arranged annularly around the compressor chamber 38. The volute 32 is in gas flow communication with a compressor outlet 33. The compressor chamber 38 is connected to the volute 32 by a radially-extending diffuser space 39 (also referred to as a "diffuser") which is a gap between a radially-extending shroud surface 25 of the housing 17, and a radially extending hub surface 26 of the bearing housing 13. The diffuser 39 is rotationally symmetric about the rotational axis 1 of the shaft 18.

In use, exhaust gas is provided to the two exhaust gas inlets 19a, 19b from an exhaust manifold (also referred to as an outlet manifold) of the engine (not shown) to which the turbocharger is attached. The inlets 19a, 19b are divided by a divider wall 20 which extends radially inwardly from the radially outer wall 21 of the turbine housing 15, to a tip 22. The exhaust gas passes from the exhaust gas inlets 19a, 19b to the exhaust gas outlet 10 via a turbine wheel 14, which is rotated by the exhaust gas. The turbine wheel 14 in turn rotates the compressor wheel 16 which thereby draws intake air through the compressor inlet 31 and delivers boost air to an inlet manifold of the engine via the diffuser 39, the volute 32 and then the outlet 33.

It is known to provide the turbine housing with at least one valve-controlled bypass port in communication with a gas inlet volute and referred to as a wastegate port, to enable control of the turbocharger boost pressure and/or shaft speed. The (or each) wastegate port is the inlet of a tubular wastegate chamber, and an outlet of the wastegate chamber is in communication with the turbine output or the atmosphere. A wastegate valve (typically a poppet type valve) is provided, including a valve member which is movable within the wastegate chamber. For example, the valve member may be mounted on an arm which is rotatable about a pivot mounted to the wastegate chamber and distant from the wastegate valve.

The combination of the wastegate port, the wastegate valve and the wastegate chamber is referred to as a wastegate. The wastegate is closed by advancing the valve member to an advanced position at which it blocks the wastegate port, and thereby prevents gas entering the wastegate chamber. The wastegate valve is opened by retracting the valve member from the wastegate port to a retracted position. This allows gas from the turbine to enter the wastegate chamber through the wastegate port, then flow between the valve member and an inwardly facing surface of the wall, to the outlet of the wastegate chamber. The wastegate valve is controlled to open the wastegate port (bypass port) when the boost pressure of the fluid in the compressor outlet increases towards a pre-determined level, thus allowing at least some of the exhaust gas to bypass the turbine wheel.

An example of this is shown schematically in cross-section in FIG. 2. The gas inlet 40 communicates with the wastegate chamber 41 via a wastegate port 42. The wastegate chamber 41 contains a valve member 50 mounted on a support member 60.

The support member 60 is movable by an actuator (not shown) to move the valve member 50 between an advanced position in which it blocks the wastegate port 42, and a retracted position in which it permits fluid to pass through the wastegate port 42. The support member 60 is supported by a linkage mechanism which connects the support member to the actuator. The linkage mechanism includes a second support member (not shown) which supports the support member 60. The connection between the support member 60 and the second support member may permit a degree of articulation of the support member relative to the second support member, and for that reason the support member 60 may be referred to as a "rocker plate".

The valve member 50 has a rotational axis 51 and is viewed in cross-section perpendicular to that axis. The valve member 50 includes a sealing portion 52 which has a sealing surface 53 which can be moved to block the wastegate port 42. The valve member 50 also includes a pin portion 54. The valve member 50 is connected to the support member 60 by inserting the pin portion 54 through a circular-cylindrical aperture 61 in the support member 60, and riveting a washer 70 larger than the aperture 61 to the pin portion on the other side of the support member 60 from the sealing portion 52 of the valve member 60.

Conventionally wastegate valves are mounted on the support member in such a manner as to permit a small degree of articulation (rotation) relative to the support member. This allows the position of the wastegate valve to compensate for manufacturing tolerances, as well as for differential thermal expansion of components of the turbine, for example due to the components of the turbine being formed of different materials or being at different temperatures. However, if the wastegate valve rotates too far there is a risk that the outer edge of the sealing portion of the wastegate member would catch against the rim of the wastegate port, and perhaps be trapped there. This would mean that the wastegate port could no longer be closed, which would lead to failure of the system. Although the risk of catching could be reduced by making the valve member much wider than the wastegate port, this would mean that in the retracted position the valve member would significantly impede fluid flow through the wastegate.

In the example of FIG. 2, articulation is possible because the circular-cylindrical aperture 61 in the support member 60 is larger than the diameter of the pin portion 54, but articulation is limited by collisions between the support member 60 and an outer edge of the washer 70. The degree of articulation is conventionally controlled by controlling the axial clearance d1 between the washer 70 and the support member 60.

It is known to provide multiple wastegate ports within a single turbine. For example, in turbine housings with two gas inlets, a wastegate port may be provided for each gas inlet volute. Multiple wastegate valve members may be provided supported via a support member on a single arm, to provide controllable blockage of the respective wastegate ports. An arrangement of this kind is shown in European patent application EP 0401615. The two wastegate valve members are attached to opposite ends of an elongate support member. The centre of the support member is coupled to an arm which can be moved by an actuator. The wastegate valve members are connected to the support member by respective pin portions, which extend through respective apertures in the support member.

SUMMARY OF THE DISCLOSURE

It is an object of the present disclosure to provide a new and useful turbine which obviates or mitigates disadvantages present in the prior art.

In general terms, the present disclosure proposes that articulation between a valve member and a support member which supports it is permitted by sliding motion between a concave surface of the valve member sliding over a convex support surface of the support member. The two support surfaces may be portions of respective ellipsoids (e.g. spheres, but not limited to spheres).

Articulation of the valve member about the support member is limited by arranging for respective limit areas on the valve member and the support member to collide when the articulation reaches a maximum amount. The limit area of the valve member is a rear surface of a sealing portion of the valve member opposite a sealing surface which in use seals the wastegate port. The limit area of the valve member is further from an axis of the pin portion than the support surface of the valve member. The limit area of the support member is a portion of a front surface of the support member facing towards the sealing portion of the valve member, and further from an axis of the aperture than the support surface of the support member.

The valve member is held against the support member using a washer attached to a pin portion of the valve member passing through an aperture in the support member.

The centre of relative rotation of the support surfaces is preferably between the sealing surface of the valve member and the outer surface of the washer (which may be defined as the point furthest from the sealing surface where the washer contacts the valve member). Locating the centre of relative rotation of the support surfaces in such a position reduces the amount of movement which the washer has to perform relative to the support member as the valve member articulates. This means that the washer can be positioned so as to limit more tightly movement of the pin portion of the valve member relative to the support member, and thus reduces the free play in the system.

More preferably, the centre of relative rotation of the support surfaces is between the sealing surface of the valve member and the inner surface of the washer, which may be defined as the point closest to the sealing surface where the washer contacts the valve member.

The pin portion of the valve member may define a central axis, which may coincide with a central axis of the washer. In use, aerodynamic forces typically cause the valve member to rotate in one direction about the axis until the washer impacts the contact surface(s), but there is some possibility of oscillatory movement which may lead to wear. In the present arrangement, however, the support member is preferably formed with one or more contact surfaces to limit rotation of the valve member about the axis of the pin portion.

In principle, the rotation of the valve member about the axis may be limited by interaction of the support surfaces. In other words, in this case the contact surface(s) of the support member would include part(s) of the support surface of the support member. For example, both support surfaces may be portions of respective ellipsoids, each having three principal axes. A principal axis of the convex support surface of the support member transverse to the axis of the pin portion may be longer than a principal axis of the concave support surface of the valve member transverse to the axis of the pin portion, so that rotation of the valve member about the axis of the pin portion (i.e. bringing the respective principal axes of the respective support surfaces towards alignment) causes the two support surfaces to collide.

Alternatively, and more preferably, one or both of the two support surfaces may be portions of spheres ("spherical surfaces") having a common centre. The spheres may have substantially the same radius of curvature. Note that due to machining tolerances the radius of curvature may not be exactly identical; indeed the support surfaces may be chosen to have slightly different respective radii of curvature. For example, the convex support surface may be chosen to have a slightly smaller radius of curvature than the concave support surface, e.g. to ensure that, even taking machining tolerances into account, its radius of curvature does not exceed that of the concave support surface.

In this case, the support surface of the support member does not include the contact surface(s) of the support member. Instead, the rotation of the valve member about the axis of the pin portion may be limited by arranging for the contact surface(s) of the support member to impact other surfaces of the valve member and/or washer as the valve member rotates about the axis.

For example, the washer may have a non-circular outer profile, and the contact surfaces of the support member may be positioned to limit rotation of the washer when the valve member rotates about the axis of the pin portion, which may substantially coincide with a central axis of the washer. The clearance between the washer and the contact surface(s) of the support member may be arranged to be low, so the impact surface(s) of the washer and the contact surface(s) may be almost parallel when they meet. This means that the portions of the washer and support member which bear the force of the impact can be made relatively larger. This reduces wear, and consequently improves the life of the wastegate assembly.

The washer may be formed located within a seat (i.e. a central cavity) within the support member. The seat has inwardly-facing contact surfaces which limit the range of angular motion of the washer around a central axis of the washer, which in turn limits the range of angular motion of the valve member about its own central axis. For example, the washer may be formed as, when viewed along its central axis, a polygon including the central axis, and the seat of the washer may include elements which, in at least one radial direction about a central axis of the aperture in the support member, are closer together than a diameter of the polygon. In one example, the washer and the seat may be formed as polygons (when viewed along the central axis) with the same number of sides, such that a maximum diameter of the washer is greater than a minimum diameter of the seat. For example, the washer and the seat may both be square with the diagonal length of the washer being greater than the length of one of the sides of the seat.

As pointed out above, the position of the centre of relative rotation of the support surfaces reduces the amount of motion which the washer has to be allowed relative to the support member. In particular, the washer is not required to be able to be displacable to such a great extent laterally (i.e. in directions transverse to the central axis of the valve member), so the contact surface(s) of the seat can sit close to the washer, reducing the angular range of the positions the valve member can take about its central axis. Furthermore, the size of the washer and the seat can be reduced, without reducing their effectiveness.

The limit area of the valve member may be radially inward of the outer edge of the sealing portion of the valve member. It may encircle (that is, surround; it is not necessarily circular) the pin portion of the valve member, and at each angular position about the pin portion provide a respective limit point which is arranged to limit articulation of the valve member in a respective plane by colliding with a corresponding respective limit point on a limit area of the support member.

A central aperture of the washer, which in use contains the pin portion of the valve member, may be non-circular, such as polygonal (e.g. a square) to increase the torque which the washer can exert on the pin portion of the valve member before the valve member rotates relative to the washer.

The support member may support multiple valve members of the type discussed above, with each valve member being connected to the support member using a respective washer, and presenting a respective sealing surface for closing a respective wastegate port when the wastegate assembly is located with the sealing surface against the respective wastegate port. Thus, the wastegate assembly can be used in a turbine including a divided turbine housing, with different gas inlets of the housing including respective wastegate ports communicating with the wastegate chamber containing the wastegate assembly.

In a specific expression of the first aspect of the disclosure, there is provided a wastegate assembly for a turbine comprising: a turbine wheel; a turbine housing defining at least one gas inlet upstream of the turbine wheel and a turbine outlet downstream of the turbine wheel; and a wastegate chamber communicating with the at least one gas inlet via one or more wastegate ports;

the wastegate assembly comprising:
a support member;
at least one valve member mounted on the support member for articulation about the support member, the or each valve member having a central axis, a sealing portion having a sealing surface for blocking a respective one of the wastegate ports, and a pin portion; and
for each valve member, a respective washer connected to the valve member for retaining the pin portion of the respective valve member inserted through a corresponding aperture defined by the support member;
each valve member comprising a concave support surface which bears against a corresponding convex support surface of the support member, the valve member and support member being arranged for relative articulation as the two support surfaces slide against each other;
a rear surface of the sealing portion opposite to the sealing surface including an limit area of the valve member which is further from an axis of the pin portion than the support surface of the valve member, the limit area of the valve member being arranged to limit articulation of the valve member by colliding with a limit area of the support member, the limit area of the support member being a portion of a front surface of the support member facing towards the sealing portion of the valve member.

According to a second aspect of the disclosure there is provided a turbine comprising a wastegate assembly according to the first aspect of the present disclosure.

According to a third aspect of the present disclosure there is provided a turbocharger or powerturbine including a turbine according to the second aspect of the present disclosure.

In the case that the wastegate assembly includes multiple valve members, their respective sealing surfaces may have different respective areas. Thus, if the wastegate assembly is located in a position in which the sealing surfaces are slightly spaced from the respective wastegate ports, the sealing surfaces would obstruct fluid flow through the respective wastegate ports to different respective degrees, resulting in different amounts (e.g. fluid flow rates) of wastegate flow on each side of the turbine housing. The concept of a wastegate assembly with multiple valve members having respective sealing surfaces of different respective areas constitutes an independent fourth aspect of the disclosure.

A specific expression of the fourth aspect of the disclosure is a wastegate assembly for a turbine comprising: a turbine wheel; a turbine housing defining at least one gas inlet upstream of the turbine wheel and a turbine outlet downstream of the turbine wheel; and a wastegate chamber communicating with the at least one gas inlet via a plurality of wastegate ports;

the wastegate assembly comprising:

a support member;

two valve members mounted on the support member for articulation about the support member, the or each valve member having a central axis, and a sealing portion comprising a sealing surface, the sealing surfaces of the valve members being for blocking respective ones of the plurality of wastegate ports;

the sealing surfaces of the valve members having different respective areas.

The ratio of the areas of the two sealing surfaces is preferably at least 1.1 and may be at least 1.3, at least 1.5, at least 2.0 or even at least 3.0. It may be no more than 1.5, no more than 2.0, no more than 4.0, or no more than 5.0.

In principle, the wastegate assembly may include more than two valve members mounted on the support member, and having sealing surfaces with respective areas which are not all the same.

According to a fifth aspect of the disclosure there is provided a turbine comprising a wastegate assembly according to the fourth aspect of the present disclosure.

According to a sixth aspect of the present disclosure there is provided a turbocharger or powerturbine including a turbine according to the fifth aspect of the present disclosure.

As used in this document, the expression that a first surface on a first element "faces towards" a second surface on a second element is not intended to imply that the two surfaces are exactly parallel. Rather it means that a normal direction at a first point on the first surface out of the first element intersects with a second point on the second surface on the second element. The angles between the normal to the first surface at the first point, and the normal to the second surface at the second point may be up to about 60 degrees or about 40 degrees, but may be no more than 20 degrees or no more than 10 degrees.

BRIEF DESCRIPTION OF THE FIGURES

Specific embodiments of the present disclosure will now be described, by way of example only, with reference to the accompanying drawings, in which.

DETAILED DESCRIPTION OF THE EMBODIMENTS

Figure 2:
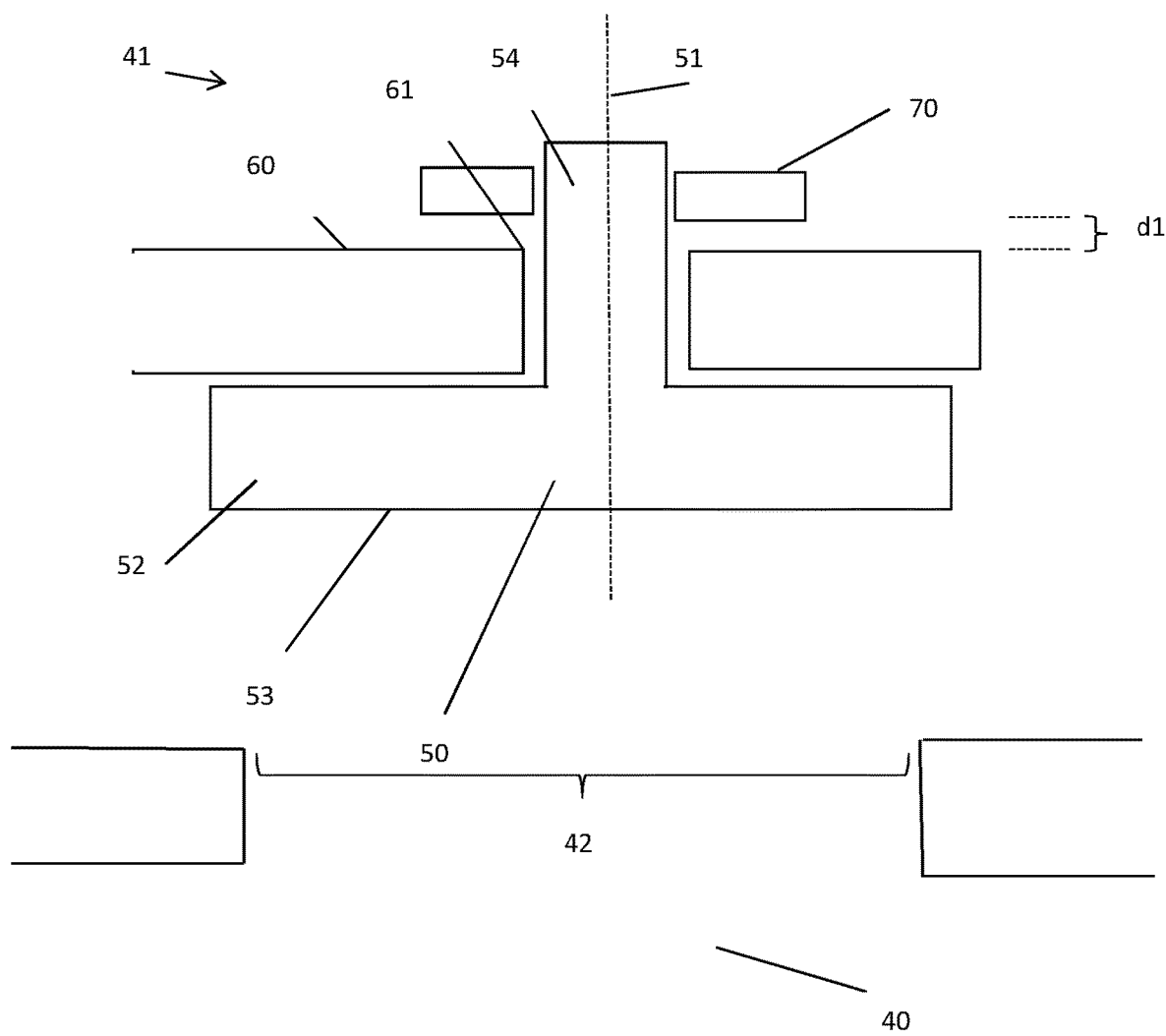
FIG. 2 shows a schematic cross-section through a wastegate of the turbine of the turbocharger of FIG. 1.
Figure 3A:
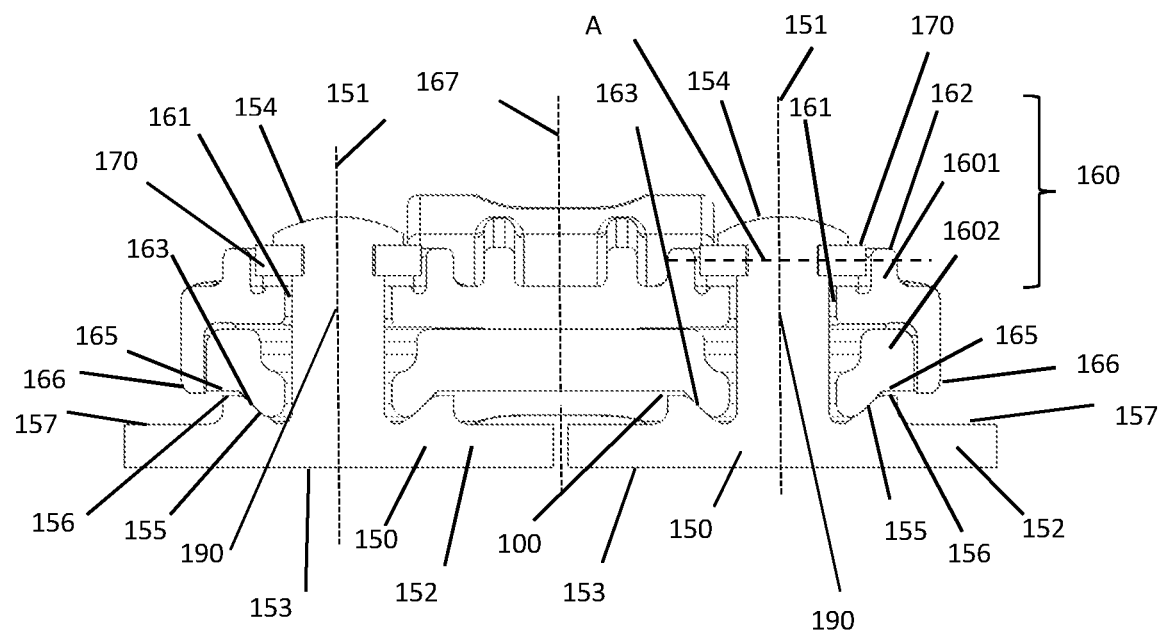
FIG. 3 is composed of FIG. 3(a) which is a schematic cross-sectional view of a portion of a wastegate assembly which is a first embodiment of the disclosure, FIG. 3(b) which is a perspective view of the same portion of the wastegate assembly viewed in the same direction as FIG. 3(a), and FIG. 3(c) which is a view of the wastegate assembly viewed in a direction indicated in FIG. 3(b)
Figure 3B:
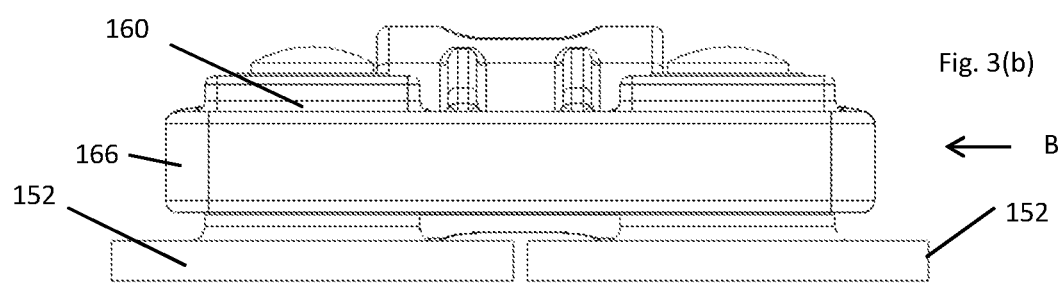
Figure 3C:
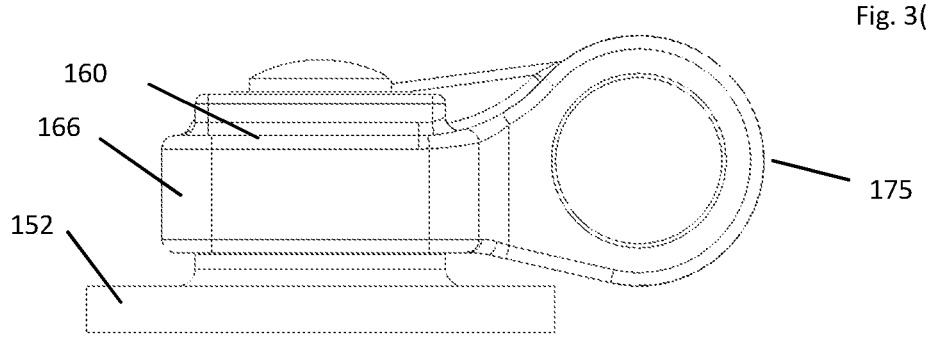

Referring firstly to FIG. 3, a portion is shown of a wastegate assembly which is a first embodiment of the disclosure. Elements corresponding to elements of FIG. 2 are given reference numerals 100 higher. FIG. 3 includes FIG. 3(a) which is a cross-sectional view of the portion of the wastegate assembly viewed in a certain direction. FIG. 3 further includes FIG. 3(b) which is a perspective view of the portion of the wastegate assembly viewed in the same direction. In FIG. 3(b) a direction B is marked, and FIG. 3(c) is a perspective view of the portion of the wastegate assembly looking in the direction B.

Figure 1:
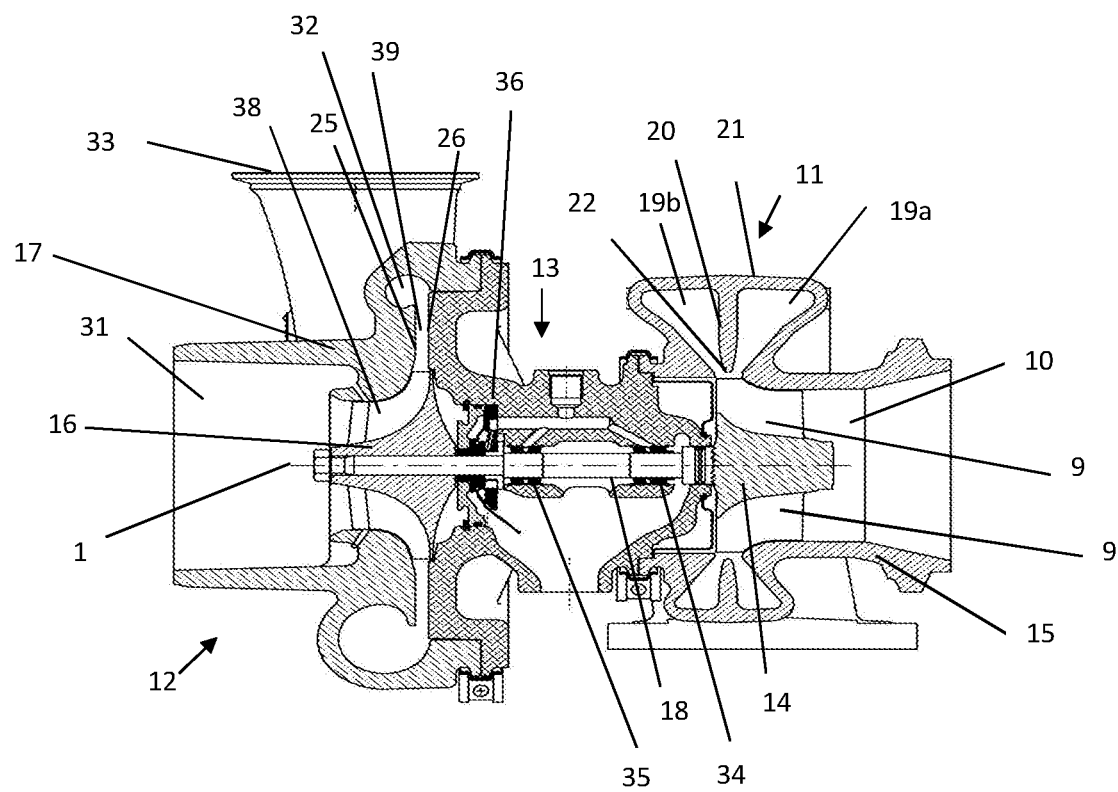
FIG. 1 shows a schematic cross-section through a portion of a known turbocharger.

The wastegate assembly is for location within the wastegate chamber of a turbocharger as shown in FIG. 1. The wastegate chamber communicates with the gas inlets via wastegate ports, and with an outlet of the turbine. In this embodiment the wastegate assembly includes a pair of substantially identical valve members 150 which have a respective central axis 151. Each of the valve members includes a respective sealing portion 152 which extends laterally away from the central axis 151, and a respective pin portion 154. The sealing portion 152 has a respective sealing surface 153 which is for pressing against a respective one of the wastegate ports with a portion of the sealing surface in register with the wastegate port. The sealing surface 153 has a larger area than the corresponding wastegate port to ensure there is an overlap around the periphery of the port to provide effective sealing. The smaller this overlap is, the greater risk there is of the valve member "hanging on" (i.e. become trapped against) the rim of the port if the valve member articulates as the wastegate is being closed. The wastegate assembly can be moved by an actuator (not shown) connected to the support member 160 via a linkage mechanism to advance the sealing surfaces at the same time to the respective wastegate ports so as to block them, or to retract them at the same time from the respective wastegate ports to permit fluid flow through them.

The linkage mechanism includes an arm 175 (viewed along its axis in FIG. 3(c)) which supports the support member 160. The actuator is able to rotate the arm 175 around its axis, to advance the sealing portions 152 towards the respective ports, or withdraw the sealing portions 152, 153 from the respective ports.

The support member 160 is not a one-piece unit, but is instead composed of a first support member element 1601 which is attached via the linkage mechanism to an actuator, and a second support member element 1602 which is supported by the first support member element 1601. Each of the first and second support members 1601 and 1602 is elongate. FIG. 3(a) shows, in cross-section, a wastegate assembly configuration in which respective length directions of the support member elements 1601, 1602 are parallel and in the right-left direction in FIG. 3(a), such that the entire support member 160 has a plane of mirror symmetry 167.

Movement of the support member element 1602 in any direction transverse to the central axes 151 of the valve members 150, is limited by walls 166 which project from the support member element 1601 in the direction towards the sealing portions 152 of the valve members 150, and which surround the support element 1602 as viewed parallel to one of the central axes 151 so as to define a chamber (which is open in the direction towards the sealing portion 152 of the corresponding valve member 150). The support member element 1602 may be free to move within the chamber defined by the support member element 1601. Optionally, the walls 166 may be located so as to permit the support member element 1602 to rock about an axis which is along the horizontal direction in FIG. 3(a); that is, parallel to a separation direction of the valve members 150, or in other words transverse to the plane of mirror symmetry 167.

Furthermore the support member element 1602 can rotate about an axis which is in the direction into the page in FIG. 3(*a*), about a (flattened) fulcrum on the plane of symmetry 167, where surfaces of the support member elements 1601, 1602 meet. It can be seen in FIG. 3(*a*), that the gap between the two support member elements 1601, 1602 tapers from the region near walls 166 to the plane of symmetry 167, where the fulcrum is located.

The two valve members 150 are supported from the support member 160 via respective pin portions 154 of the valve members 150 which pass through respective apertures 161 in the support member elements 1601, 1602, and are then connected by riveting to respective washers 170 which retain the distal end of the pin portions 154 on the opposite side of the support member 160 from sealing portions 152 of the valve members 150.

Each of the valve members 150 includes a central axis 151, which may be an axis of rotational symmetry of the sealing portion 152 of the valve member 150. The apertures 161 are circular-cylindrical, defining respective axes. As depicted in FIG. 3, the axes of the apertures 161 are co-incident with the axes 151 of the respective valve members 150. Each washer 170 is located within a seat region surrounded (as viewed along the axis 151) by a wall 162 projecting from the rear surface of the support member element 1601 which faces away from the sealing portion 152 of the valve member 150.

Figure 4:
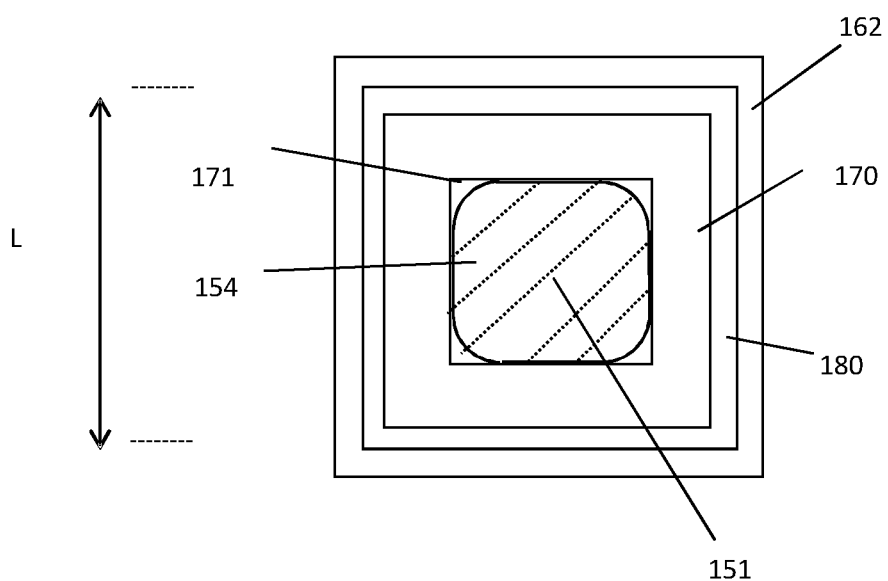
FIG. 4 is an axial view of a washer in the embodiment of FIG. 3.

The pin portion 154 of one of the valve members 150 is viewed in FIG. 4 in a cross-section in the plane marked A in FIG. 3 which is parallel to the axis 151. The axis 151 intersects the plane A at the centre of FIG. 4. Each washer 170 is longitudinally-symmetric in the direction parallel to the axis 151 and its end surfaces in this direction are substantially planar. The washer 170 defines a central aperture 171 extending transverse to the plane A. The aperture 171 is cuboidal. As viewed along the axis 151 of the pin portion 154 of the corresponding valve member 150, the aperture 171 appears square.

Prior to the riveting of the washer to the pin portion, the pin 154 was circularly symmetric about the central axis 151, so that the entire valve member 150 was circularly symmetric about this axis. This means that the valve member 150 can be attached to the support member 160 without having to control the rotational position of the valve member 150 about the central axis 151. However, the pin portion 154 is riveted into the aperture 171 in such a way as to compress the round outer profile of the pin portion 154 into the lozenge-shape shown in FIG. 4, with a four-fold rotational symmetry about the axis 151. Interaction between the pin portion 154 and the aperture 171 prevents the pin portion 154 from rotating relative to the washer 150 about the axis 151. There is a gap 180 between the square outer profile of the washer 170 as viewed in FIG. 4, and the wall 162, so the washer 170 is able to move slightly relative to the wall 162, but the wall length L of the wall 162 is less than the diagonal extent of the washer 170, so the washer 170 can only rotate about the axis 151 relative to the wall 162 about the axis 151 within a limited angular range. The range of angular rotation in the arrangement illustrated is less than 90 degrees, but in alternative embodiments higher or lower angular ranges are possible, so long as the washer cannot rotate by 360 degrees. Rotation of the washer to either end of the angular range causes the outer edge of the washer 170 to collide with the wall 162. Thus, the wall 162 defines four contact surfaces (the four flat inwardly facing surfaces of the wall 162) which collide with respective impact surfaces of the washer 170, and thereby limit rotation of the washer 170. The impact surfaces of the washer may be flat, and include a line which is parallel to the axis 151 (so that they are not visible in FIG. 4). The clearance of the impact surfaces and the contact surfaces is low relative to the length of the walls 162, so that the impact surfaces impact against the contact surfaces when the corresponding surfaces are almost parallel. For this reason, the force between them is distributed over a relatively large area, thereby reducing wear.

In the embodiment, as viewed in FIG. 4 in a direction parallel to the axis 151, the end of the washer 170 is square, as is the space surrounded by the contact surface 162. However, it is to be appreciated that in other embodiments of the disclosure the number of contact surfaces of the wall 162, and the number of impact surfaces of the washer 170, may be different from four. Further, as viewed in the direction parallel to the axis 151, the washer 170 may be a shape other than square, such as rectangular. Similarly, the contact surfaces may not be inwardly facing surfaces of a wall 162 which entirely encircles the washer. The contact surfaces may, for example, be provided on respective elements which project from the first support member element 1601.

The support member 160 is formed with two convex support surfaces 163 which are each a portion of a respective sphere ("spherical surfaces"), on a front surface of the support member element 1602. A rear surface 157 of the valve members 150, which faces towards the support member 160, is formed with a respective concave support surface 155 which is a portion of a respective sphere having the same radius of curvature as the support surfaces 163 of the support member element 1602 (or slightly larger). The support surfaces 155 of the respective valve members 150 lie against corresponding ones of the support surfaces 163, such that the centres of the spheres are coincident at a corresponding common centre point marked 190. That is, all points on the support surfaces 155, 163 are equidistant from the corresponding common centre point 190.

Due to sliding motion between the support surfaces 155, 163, the valve member 150 can articulate relative to the support member element 1602. The gap 180 between the outer edge of the washer 170 and the wall 162 is sufficient to permit this limited motion. In all articulation positions, the centre of rotation of the support surfaces 155, 163 is the common centre point 190 where the axis 151 of the valve member 150 intersects with the central axis of the aperture 161.

The common centre point 190 is between the sealing surface 153 of the sealing portion 152 of the corresponding valve member 150, and the point furthermost from the sealing surface 153 at which the pin portion 154 of the valve member 150 touches the corresponding washer 170. Indeed, the common centre point 190 is between the sealing surface 153 of the sealing portion 152 of the corresponding valve member 150, and the point closest to the sealing surface 153 at which the pin portion 154 of the valve member 150 touches the corresponding washer 170. Denoting the ratio of (i) the distance of the common centre point 190 from the sealing surface 153, to (ii) the distance from the sealing surface 153 to the point furthest from the sealing surface 153 at which the pin portion 154 of the valve member 150 touches the corresponding washer 170, by x, the value of x preferably lies in the range 0.4 to 1.0, and more preferably 0.6 to 1.0, or even 0.8 to 1.0. Since the centre of rotation 190 is proximate the washer 170 (i.e. the value of x is close to 1), the degree of motion which the washer 170 experiences to permit the articulation is relatively small, so the gap 180 between the washer 170 and the wall 162 can be small also, implying that the washer 170 is not able to rotate by a large amount about the central axis 151.

Articulation of the valve members 150 with respect to the support member element 1601 is limited by respective circular limit areas 156 on the valve members 150, and corresponding limit areas 165 on the support member element 1602. Optionally, the limit areas 156, 165 may be chosen to be non-circular, e.g. to be elliptical, such as with their long axes parallel to, or transverse to, the spacing direction of the valve members 150. A gap 100 exists between the corresponding limit areas 156, 165. Specifically, the articulation allows the central axis 151 of each valve member 150 to rotate in any articulation direction up to a maximum articulation angle to the central axis of the corresponding aperture 161. The maximum articulation angle may be in the range 2 degrees to 15 degrees, or more preferably 3 degrees to 10 degrees. When the valve member has articulated by the maximum articulation angle, the gap 100 between the corresponding limit areas 156, 165 closes at corresponding points on each of the limit areas 156, 165.

Figure 5:
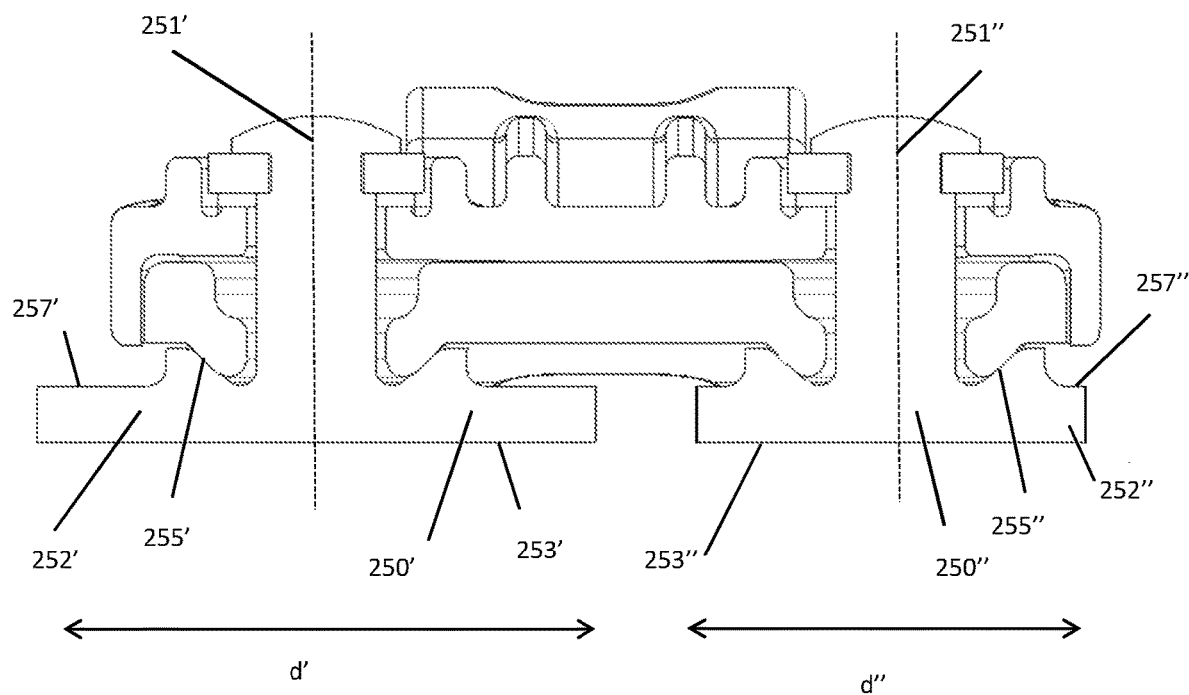
FIG. 5 shows a portion of a wastegate assembly which is a second embodiment of the disclosure.

Turning to FIG. 5 a second embodiment of the disclosure is illustrated. The embodiment is identical to the embodiment of FIG. 4 with the exception that the respective sealing surfaces 253', 253" of the sealing portions 252', 252" of the valve members 250', 250" have different respective diameters d', d". Each of the valve members 250', 250" has a respective central axis 251', 251" which is an axis of rotational symmetry of the corresponding sealing portion 252', 252". The support surfaces 255', 255" of the valve members 250', 250" are formed with the same shape as the support surfaces 155 of the valve members 150 of the first embodiment, but the portion of the rear surface 257' which is further from the central axis 251' than the support surface 255', extends away from the axis 251' by a greater distance than the portion of the rear surface 257" which is further from the central axis 251" than the support surface 255" extends from the central axis 251".

Due to the different diameters of the sealing surfaces 253', 253", even if the wastegate ports of the turbine housing are symmetrical, and the support member is arranged with the same symmetry, the valve members 250', 250" can permit different amounts of wastegate flow through the ports, for example in a position in which they are retracted by a short distance from their respective positions in which they seal the respective wastegate ports completely.

Note that although in the second embodiment the sealing surfaces 253', 253" are circularly symmetric, which has the advantage that they can be attached to the support member without selecting and/or controlling their rotational position about the axes 251', 251", in variations of the embodiment the sealing surfaces 253', 253" might be of a different shape, and possibly have different shapes from each other.

The ratio of the area of the two sealing surfaces 253' to that of the sealing surface 253" (that is, the ratio $(d'/d'')^2$ in the case that the sealing surfaces 253', 253" are circular) is preferably at least 1.1 and may be at least 1.5, at least 2.0 or even at least 3.0. It may be no more than 4.0, or no more than 5.0.

It is to be appreciated that numerous modifications to the above-described embodiments may be made without departing from the scope of the disclosure as defined in the appended claims. For example, although in the embodiments the rotation of each valve member about the axis of the pin portion is limited by interaction of the corresponding washer with a support member, in other embodiments the respective support surfaces of the valve member and the support member are non-spherical, and the rotation is limited by interaction between them.

Although the previous description is related to embodiments of a turbine according to the present disclosure which forms part of a turbocharger, it will be appreciated that a turbine according to the present disclosure may form part of any appropriate turbomachine. For example, a turbine according to the present disclosure may form part of a turbomachine which does not include a compressor. In particular, a turbine according to the present disclosure may form part of a power turbine, for example a power turbine which converts the rotation of a turbine wheel into electrical power.

Although the above described embodiments relate to a turbine which operates in conjunction with gas, it will be appreciated that turbines according to the present disclosure may operate in conjunction with any appropriate fluid, for example a liquid.

The invention claimed is:

1. A wastegate assembly for a turbine comprising: a turbine wheel; a turbine housing defining at least one gas inlet upstream of the turbine wheel and a turbine outlet downstream of the turbine wheel; and a wastegate chamber communicating with the at least one gas inlet via one or more wastegate ports;

the wastegate assembly comprising:

a support member;

at least one valve member mounted on the support member for articulation about the support member, the or each valve member having a central axis, a sealing portion having a sealing surface for blocking a respective one of the wastegate ports, and a pin portion; and for each valve member, a respective washer connected to the valve member for retaining the pin portion of the respective valve member inserted through a corresponding aperture defined by the support member;

each valve member comprising a concave support surface which bears against a corresponding convex support surface of the support member, the valve member and support member being arranged for relative articulation as the two support surfaces slide against each other;

a rear surface of the sealing portion opposite to the sealing surface including an limit area of the valve member which is further from an axis of the pin portion than the support surface of the valve member, the limit area of the valve member being arranged to limit articulation of the valve member by colliding with a limit area of the support member, the limit area of the support member being a portion of a front surface of the support member facing towards the sealing portion of the valve member.

2. The wastegate assembly according to claim 1 in which the support member is formed with one or more contact surfaces which limit rotation of the valve member.

3. The wastegate assembly according to claim 2 in which each washer has a central axis and non-circular outer profile about the central axis of the washer, the contact surfaces of the support member being arranged to limit rotation of the washer around the central axis of the washer.

4. The wastegate assembly according to claim 3 in which each washer has a square outer profile, and the contact surfaces of the support member define a washer seat containing the washer and having a four-fold symmetry about the washer.

5. The wastegate assembly according to claim 1 in which the common centre of the support surfaces is between the sealing surface of the valve member and a point on the washer closest to the sealing surface where the washer contacts the valve member.

6. The wastegate assembly according to claim 5 in which, denoting by x the ratio of (i) the distance of the common centre of the support surface from the sealing surface, to (ii) the distance from the sealing surface to the point on the washer furthest from the sealing surface where the washer contacts the valve member, the value of x lies in the range 0.4 to 1.0.

7. The wastegate assembly according to claim 6 in which the value of x is in the range 0.6 to 1.0.

8. The wastegate assembly according to claim 6 in which the value of x is in the range 0.8 to 1.0.

9. The wastegate assembly according to claim 1 in which the two support surfaces are portions of respective ellipsoids have a common centre, the common centre of the support surfaces being between the sealing surface of the valve member and a point on the washer furthest from the sealing surface where the washer contacts the valve member.

10. The wastegate assembly according to claim 9 in which the two support surfaces are portions of respective spheres having a common centre.

11. The wastegate assembly according to claim 1 in which the washer defines a non-circular central aperture.

12. The wastegate assembly according to claim 1 in which the support member comprises a first support member element for connection to an actuator, and at least one second support member element which is supported by the first support member element and movable relative to the first support member element, the convex support surface(s) being surfaces of the second support member element(s).

13. The wastegate assembly according to claim 12 in which the first support member element defines a chamber, the second support member element being free to move within the chamber.

14. The wastegate assembly according to claim 1 in which there are a plurality of said valve members, the sealing surfaces of the valve members having different respective areas.

15. The wastegate assembly according to claim 14 in which a ratio of the areas of the sealing surfaces of two of the valve members is at least 1.1.

16. The wastegate assembly according to claim 1 in which at least one said valve member has a rear surface of the sealing portion opposite to the sealing surface including an limit area of the valve member radially inward of the outer edge of the sealing portion of the valve member, the limit area of the valve member being arranged to limit articulation of the valve member by colliding with a corresponding limit area of the support member, the limit area of the support member being a portion of a front surface of the support member facing towards the sealing portion of the valve member.

17. A turbine including:
a turbine wheel;
a turbine housing defining at least one gas inlet upstream of the turbine wheel and a turbine outlet downstream of the turbine wheel;
a wastegate chamber communicating with the at least one gas inlet via one or more wastegate ports;
a wastegate assembly according to; and
an actuator operative to move the wastegate assembly between an advanced position in which the wastegate assembly obstructs the one or more wastegate ports, and a retracted position in which the wastegate assembly permits fluid flow through the wastegate ports;

wherein the wastegate assembly comprises:
a support member;
at least one valve member mounted on the support member for articulation about the support member, the or each valve member having a central axis, a sealing portion having a sealing surface for blocking a respective one of the wastegate ports, and a pin portion; and
for each valve member, a respective washer connected to the valve member for retaining the pin portion of the respective valve member inserted through a corresponding aperture defined by the support member;
each valve member comprising a concave support surface which bears against a corresponding convex support surface of the support member, the valve member and support member being arranged for relative articulation as the two support surfaces slide against each other;
a rear surface of the sealing portion opposite to the sealing surface including an limit area of the valve member which is further from an axis of the pin portion than the support surface of the valve member, the limit area of the valve member being arranged to limit articulation of the valve member by colliding with a limit area of the support member, the limit area of the support member being a portion of a front surface of the support member facing towards the sealing portion of the valve member.

18. A turbocharger including a turbine, the turbine including:
a turbine wheel;
a turbine housing defining at least one gas inlet upstream of the turbine wheel and a turbine outlet downstream of the turbine wheel;
a wastegate chamber communicating with the at least one gas inlet via one or more wastegate ports;
a wastegate assembly; and
an actuator operative to move the wastegate assembly between an advanced position in which the wastegate assembly obstructs the one or more wastegate ports, and a retracted position in which the wastegate assembly permits fluid flow through the wastegate ports;
wherein the wastegate assembly comprises:
a support member;
at least one valve member mounted on the support member for articulation about the support member, the or each valve member having a central axis, a sealing portion having a sealing surface for blocking a respective one of the wastegate ports, and a pin portion; and
for each valve member, a respective washer connected to the valve member for retaining the pin portion of the respective valve member inserted through a corresponding aperture defined by the support member;
each valve member comprising a concave support surface which bears against a corresponding convex support surface of the support member, the valve member and support member being arranged for relative articulation as the two support surfaces slide against each other;
a rear surface of the sealing portion opposite to the sealing surface including an limit area of the valve member which is further from an axis of the pin portion than the support surface of the valve member, the limit area of the valve member being arranged to limit articulation of the valve member by colliding with a limit area of the support member, the limit area of the support member being a portion of a front surface of the support member facing towards the sealing portion of the valve member.

* * * * *